(12) United States Patent
Fang et al.

(10) Patent No.: US 6,437,892 B1
(45) Date of Patent: Aug. 20, 2002

(54) SYSTEM FOR REDUCING THE INFLUENCE OF POLARIZATION MODE DISPERSION IN HIGH-SPEED FIBER OPTIC TRANSMISSION CHANNELS

(75) Inventors: Xiaojun Fang, Burlingame; Li-Ping Chen, Foster City; Chao-Xiang Shi, Daly City, all of CA (US)

(73) Assignee: Sprint Communications Company L. P., Overland Park, KS (US)

( * ) Notice: Subject to any disclaimer, the term of this patent is extended or adjusted under 35 U.S.C. 154(b) by 0 days.

(21) Appl. No.: 09/150,034

(22) Filed: Sep. 9, 1998

(51) Int. Cl.⁷ ............................................. H04B 10/00
(52) U.S. Cl. ...................................... 359/156; 359/173
(58) Field of Search ................................. 359/156, 161, 359/173, 181, 188

(56) References Cited

U.S. PATENT DOCUMENTS 5,115,436 A * 5/1992 McAuley .................... 714/781
5,311,346 A * 5/1994 Haas et al. .................. 359/156
5,361,270 A * 11/1994 Heismann .................... 372/27
5,590,161 A * 12/1996 Meyn et al. ................. 375/368

OTHER PUBLICATIONS

Ho, Keang–po, and Chinlon Lin. "Performance Analsys of Optical Transmission System with Polarization–Mode Dispersion and Forward Error Correction." IEEE Photonics Technology Letters, vol. 9, No. 9, Sep. 1997.*

* cited by examiner

*Primary Examiner*—Leslie Pascal
*Assistant Examiner*—Christina Y Leung
(74) *Attorney, Agent, or Firm*—Harley R. Ball; Steven J. Funk; Kevin D. Robb

(57) ABSTRACT

A system for reducing the influence of polarization mode dispersion (PMD) in high speed fiber optical transmission channels. A signal is forward error correction (FEC) encoded according to an FEC code that defines a specified error tolerance per codeword. The invention then effectively randomizes the input polarization of the signal before transmission, in order to reduce the likelihood that PMD will distort one or more codewords beyond the allowed error tolerance. The invention will thereby increase the PMD-limited transmission distance in an optical transmission system.

18 Claims, 3 Drawing Sheets

SYSTEM FOR REDUCING THE INFLUENCE OF POLARIZATION MODE DISPERSION IN HIGH-SPEED FIBER OPTIC TRANSMISSION CHANNELS

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to light wave transmission systems and more particularly to a method and apparatus for reducing the influence of polarization mode dispersion in fiber optic transmission lines.

2. Description of the Related Art

Since its invention in the 1970s, optical fiber has been used extensively to carry data signals from one location to another, both terrestrially and undersea. Compared with conventional metallic-based transmission systems, optical fibers offer many advantages, including higher bandwidth, lower cost, lower power consumption, smaller space needs, insensitivity to electromagnetic interference, and greater security. At the same time, however, optical fibers have limitations.

One of the significant limiting factors in high-speed fiber transmissions is the phenomenon known as polarization mode dispersion. Polarization mode dispersion (PMD) arises from the natural birefringence of an optical fiber that occurs when a perfect circular symmetry of the fiber is disrupted. This lack of symmetry may be introduced during fabrication of the fiber or may arise from bending or other physical stress on the fiber. PMD causes a light pulse to broaden during transmission along the fiber and therefore gives rise to distortion and data errors.

As is known in the art, each distributed fiber link of an optical transmission system has two orthogonal polarization modes, or eigen modes, referred to as Principle States of Polarization (PSP). These PSPs are an optical property of the fiber. When a light wave enters the fiber, the wave is resolved into two orthogonally polarized components aligned respectively with these two PSPs. An input light wave of arbitrary polarization may thus be expressed as a sum of components along these PSPs, which may be referred to as the PSP components of the light wave.

The two PSPs of a fiber are degenerate and have identical group delays only when the fiber profile is circularly symmetric and the fiber material is isotropic. Any asymmetry (such as slight ovality) or anisotropy will remove the degeneracy and cause the fiber to become birefringent. Due to this birefringence, the fiber will exhibit different indices of refraction for its two PSPs, which will cause the two PSP components of a light wave to propagate at different speeds down the fiber. As shown in FIG. 1, this difference in propagation velocity will split the light wave, thereby dispersing and distorting the light wave as it travels. Consequently, a single light pulse at the transmitting end may arrive as two light pulses at the receiving end.

The two PSP components of a light wave will have relative amplitudes determined by the polarization of the input light wave. For a given set of PSPs, if the input polarization falls midway between the two PSPs, then the PSP components of the light wave will be equal in amplitude. In that case, the maximum possible PMD (or worst-case PMD) will occur, since the light wave-will be split into two equal but separately-prop gating components. On the other hand, if the input polarization is aligned with exactly with one of the PSPs, then no PMD will occur (i.e., the best-case PMD),since the entire wave will travel along that one PSP.

The PMD effect can be particularly troublesome for transmission of optical data streams that contain closely spaced symbols, as PMD can cause adjacent symbols to-overlap-and become. indistinguishable. In high-speed optical transmission systems carrying digital data, for instance, PMD can cause adjacent zeros and ones to overlap, thereby introducing bit stream errors. Additionally, since the two PSP components of a light wave travel at different velocities, PMD is especially troublesome in long distance optical transmission systems, since the PSP components of the light wave will continue to disperse over the length of the system.

The PMD effect in most optical transmission systems is also not constant over time or distance, even over individual optical links. Rather, the PMD effect typically varies slowly and unpredictably throughout the system. These variations occur for many reasons. For instance, portions of fiber may be bent or otherwise subject to added stress, which may impact symmetry and therefore alter the PSPs of the fiber. These changes to the PSPs will in turn vary the PMD effect on a light wave of a given polarization. Additionally, the PSPs of a fiber can change with differences in temperature, which may arise from-changes in sunlight or ocean currents.

The distorting PMD effect imposes a limitation on the distance that an optical transmission system can competently transmit data. This distance is conventionally referred to as the PMD-limited transmission distance of the system. A transmission system that has a long PMD-limited transmission distance will require fewer repeaters to regularly receive and regenerate the optical waveform. On the other hand, a transmission system that has a short PMD-limited transmission distance will require more closely spaced repeaters, which will increase the complexity and cost of the system.

In an effort to increase this PMD-limited transmission distance, several mechanisms have therefore been proposed for minimizing the PMD effect in optical transmission systems. One technique involves applying a "PMD equalizer," which uses feedback to change the input polarization of a light signal to be the same as one of the PSPs of the transmission system, or which may alternatively process the output light signal to appropriately combine its PSP components or remove the PSP component that exhibits a higher error rate. Examples of PMD equalizers are discussed in U.S. Pat. No. 5,311,346, entitled "Fiber-optic Transmission Polarization Dependent Distortion Compensation" and issued on May 10, 1994 to AT&T Bell Laboratories; T. Takahashi, T. Imai, M. Aiki, "Automatic compensation techniques for time wise fluctuating polarisation mode dispersion in in-line amplifier systems," Electronic Letters, Vol. 30, No. 4, 348 (Feburary 1994); J. H. Winters, M. A. Santoro, "Experimental Equalization of Polarization Dispersion," IEEE Photonic Technology Letters, Vol. 2, No. 8.(August, 1980).

Another technique that has been suggested to minimize the effect of PMD and to thereby increase the PMD-limited transmission distance of an optical transmission system is to transmit data in the form of "solitions." solitions are single light pulses of a special shape and sufficient amplitude that have been shown to propagate indefinitely along a dispersive fiber without being broadened. The resistance of solitions to PMD is discussed in X. Zhang, M. Karlsson, P. A. Andrekson, K. Bertilsson, "Solition Stability in Optical Fibers With Polarization-Mode Dispersion," IEEE Photonic Technology Letters, Vol. 10, No. 3, 376–78 (March 1998).

Although solitions can be used to avoid PMD, however, each solition in a optical data stream needs to be separated from its adjacent neighbors by a certain minimum distance. Absent sufficient spacing between adjacent soltions, solition-interaction will occur, which will pull a solition from its normal position and distort the signal. This spacing requirement, of course, limits the effective bit rate in a solition-based transmission system and consequently renders solitions undesirable for high-speed optical transmission.

Recognizing that PMD will cause errors in an optical data stream, another technique that has been proposed for reducing the PMD effect is to apply forward error correction (FEC). This technique is described, for instance, in K-P. Ho, C. Lin, "Performance Analysis of Optical Transmission System with Polarization-Mode Dispersion and Forward Error Correction," IEEE Photonics Technology Letters, Vol. 9, No. 9, 1288–90 (September 1997).

FEC is commonly used to cure a variety of system impairments, such as errors that arise in wireless digital communications, for instance. In general, an FEC encoder receives a group of k information symbols (e.g., bits or bytes) and converts the information into a group of n symbols, where n>k. The group of n symbols output by the FEC encoder is referred to as a codeword or FEC block. In this process, the encoder adds p=n–k redundancy or parity symbols to the input group. At the receiving end, a corresponding FEC decoder may then use this parity information to recover from up to a predetermined maximum number of errors per FEC block. This maximum permissible number of errors may be referred to as the FEC error tolerance.

The effectiveness of FEC coding will thus depend in part on the quality and quantity of parity information transmitted in each FEC block, and in part on the error rate of the transmission channel. If the error rate over the duration of a given FEC block exceeds the FEC error tolerance, then the FEC decoder may be unable to remedy any errors in the FEC block, and the process of FEC encoding may in fact do more harm than good (for instance, as it unnecessarily increases the data rate).

The FEC encoding process works well to recover from individual errors or from at most the FEC error tolerance level of the system. An additional problem arises, however, when burst-errors occur, as burst errors can distort or destroy all or much of the parity information encoded in an FEC block. One method that has been used to overcome from burst errors in both optical and other transmission systems is to interleave the symbols of the FEC codeword so that they experience independent fading. In independent fading, the symbols affected by a burst error typically belong to several different codewords. Therefore, the effect of the burst error can be spread over the message so that it may be possible to recover the data with the original error-correcting code.

In an optical transmission system, the slowly-changing nature of PMD can give rise to errors analogous to a burst error. In particular, it is possible that a light wave of a given polarization may suffer from the worst-case PMD effect for so long at a time that the number of transmission errors arising over a given FEC block will exceed the FEC error tolerance. As a result, just like a conventional burst-error, the FEC decoder may be unable to fully recover from errors in the FEC block without sufficient interleaving.

Unfortunately, however, since the PMD effect can vary so slowly and unpredictably throughout the optical transmission system, PMD-based errors can also at times be analogous to many burst errors in a row. Specifically, it is possible that a steady worst-case PMD effect will cause the error rate to exceed the FEC error tolerance over many interleaved FEC blocks at once. As a result, those skilled in the art have concluded that no practical way exists to interleave an optical signal sufficiently to overcome from these PMD-based burst errors. (See K-P. Ho and C. Lin, at 1288, 1290).

In view of the deficiencies in the existing art, a need therefore exists for an improved system of reducing the influence of PMD in optical transmission channels.

SUMMARY OF THE INVENTION

The present invention provides an improved method and apparatus for reducing the influence of PMD in an optical transmission system. The invention stems from a realization that, unlike errors in other transmission systems, the errors that arise from PMD in an optical transmission system are directly related to the polarization of the input signal. Therefore, the polarization of the, input signal may directly impact the effectiveness of forward error correction.

With a given input polarization, and with the slow-changing nature of PMD, an optical signal can suffer from relatively long periods of high PMD error rate (caused by the input polarization having equal PSP components) and relatively long periods of low (or no) PMD error rate (caused by the input polarization being one of the PSPs), as well as a continuum of intermediate PMD error rates. These PMD errors and error rates will vary throughout the system and are generally unpredictable.

Conventionally, interleaving an FEC-coded data stream serves to enhance the effectiveness of the FEC process. In particular, interleaving works throughout transmission to randomize the impact of these errors on FEC codewords and to thereby minimize the likelihood that the worst-case errors (i.e., burst-errors) will influence successful FEC decoding.

The inventors have discovered that it is possible to use the polarization of the input light signal as a key to achieve the effect of sufficient randomization over the duration of the FEC blocks (whether or not interleaved) in an optical data stream. In particular, by sufficiently varying the input polarization compared with the unpredictable PSPs of the optical channel, the invention effectively randomizes or scrambles the PSP components of the input signal and thereby reduces the likelihood that the PMD error rate will exceed the FEC error tolerance over any given FEC block. Consequently, the invention successfully increases the effectiveness of FEC coding, and thereby reduces the impact of PMD.

The foregoing as well as other advantages of the present invention will become apparent to those of ordinary skill in the art by reading the following detailed description, with appropriate reference to the accompanying drawings.

BRIEF DESCRIPTION OF THE DRAWINGS

Preferred embodiments of the present invention are described herein with reference to the drawings, in which.

DETAILED DESCRIPTION OF THE PREFERRED EMBODIMENT

Figure 2:
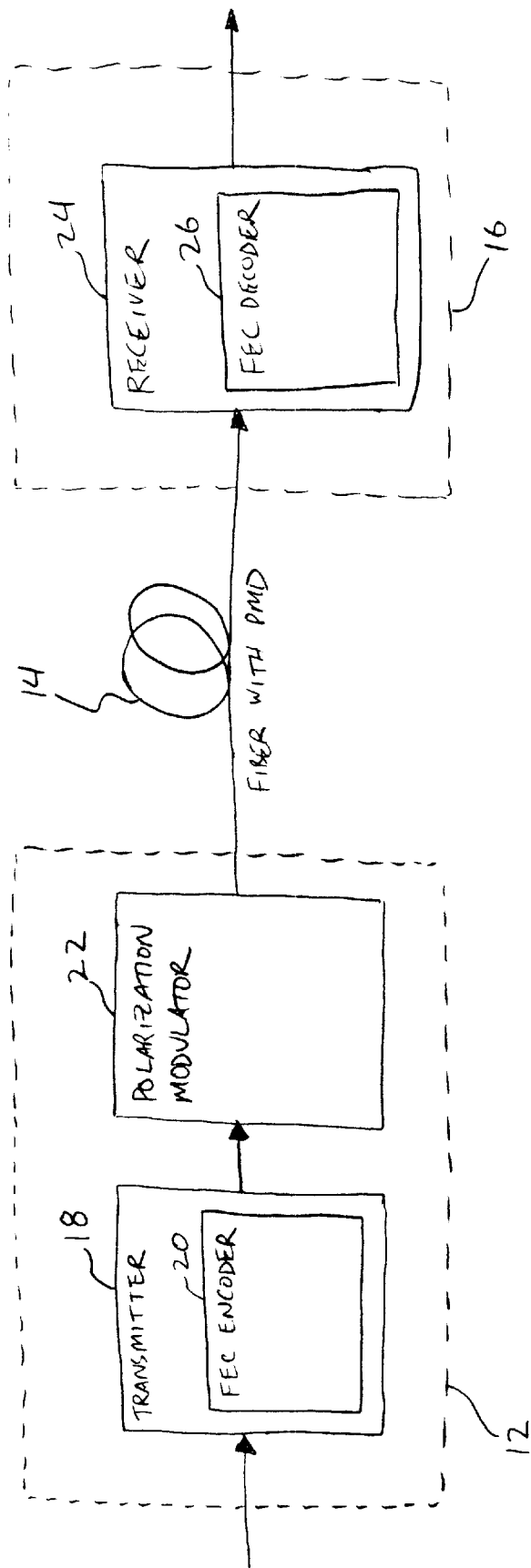
FIG. 2 is block diagram of an optical transmission system operating in accordance with a preferred embodiment of the present invention.

Referring to the drawings, FIG. 2 is a block diagram illustrating a system operating according to a preferred embodiment of the present invention. As shown in FIG. 2, an optical signal originates at a transmitting end 12 of the network and is carried along an optical channel 14 to a receiving end 16.

Optical channel 14 comprises one or more spans of optical fiber, which may be connected together by regularly spaced repeaters or other devices, as, for instance, in a SONET network configuration. For purposes of illustration, optical channel 14 may be assumed to be a long-haul terrestrial or undersea light wave system. As described in the above background section, optical channel 14 naturally includes a pair of PSPs that may vary unpredictably over time and distance due to changes in stress, temperature or other factors.

It will be understood that optical channel 14 may additionally include other communication links, for instance, in series with the optical fibers. For instance, optical channel 14 may be a combination of an optical fiber transmission line and metallic-based land lines or microwave or satellite links.

In the preferred embodiment, transmitting end 12 includes an optical transmitter 18, an FEC encoder 20 and a polarization modulator 22. Optical transmitter 18 conventionally receives a time division multiplexed (TDM) electrical waveform and serves to convert the waveform into a substantially identical optical waveform. For purposes of example, it will be assumed that the electrical waveform is an STM-16 digital bit stream with a data rate on the order of 2.5 Gbps, and the output optical waveform is linearly polarized light. Optical transmitter 18 may be a semiconductor light source with a processor-controlled driver circuit. Alternatively, it will be appreciated that optical transmitter 18 may be part of a repeater (or transceiver) that links spans of optical fiber.

In an effort to remedy errors that arise during transmission over channel 14, transmitting end 12 includes an FEC encoder 20. FEC encoder 20 serves to FEC encode the optical signal to be transmitted, typically by encoding the electrical waveform before it is converted to an optical waveform. Alternatively, it will be appreciated that FEC encoder 20 may operate directly on the optical waveform to the extent possible.

As shown in FIG. 2, FEC encoder 20 may be implemented as an integral part of transmitter 18, for instance, through digital signal processing, computer-controlled processing or other suitable mechanism. Alternatively, FEC encoder 20 may be a discrete element (such as a digital signal processor) external to transmitter, which operates on the waveform before transmission.

FEC encoder 20 applies any suitable FEC code or algorithm. As an example, for purposes of trans-oceanic optical transmission, the International Telecommunications Union has recommended the use of the well known Reed-Solomon RS(255,239) FEC code. (See ITU Recommendation G.975). The RS(255,239) code calls for encoding every incoming group of 239 bytes into an FEC block of 255 bytes. Advantageously, the RS(255,239) code has an FEC error tolerance of 8, meaning that it is capable of correcting up to 8 erroneous byte-symbols in each FEC block.

Figure 3A:
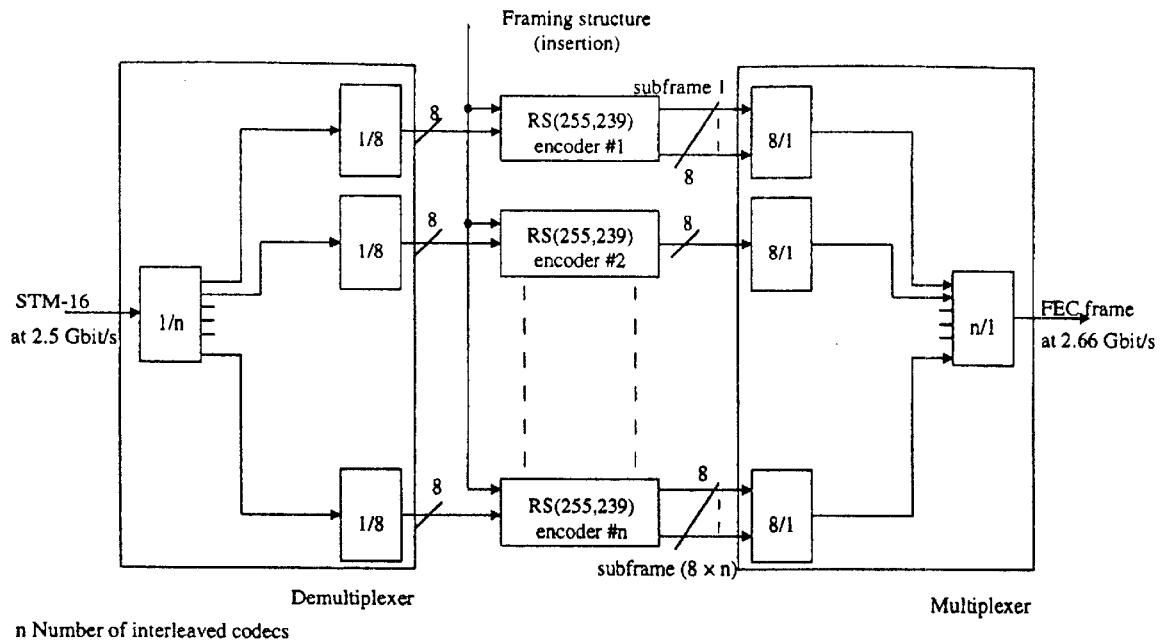
FIG. 3A is block diagram illustrating the architecture of an FEC encoder that may be employed in a preferred embodiment of the present invention.

According to the ITU, it is possible to enhance the immunity of an optical cable system to burst errors somewhat, by interleaving the FEC blocks. To do so, in the preferred embodiment, the incoming STM-16 data stream may be demultiplexed into a desired number of separate subframes, each of which is then separately encoded by the RS(255,239) algorithm to produce an FEC block or FEC subframe. These FEC subframes are then multiplexed into an outgoing data stream. FIG. 3A illustrates the architecture of one such FEC encoder, as recommended by ITU Recommendation G. 975. As shown in FIG. 3A, an STM-16 input bit stream is demultiplexed into 8 subframes of 239 bits each, each of the subframes is FEC encoded into an FEC block of 255 bits, and the resulting FEC blocks are then multiplexed into an output data stream. Note that the data rate of the output data stream is higher than the data rate of the incoming stream, due to the parity information added by the FEC encoder.

Figure 1:
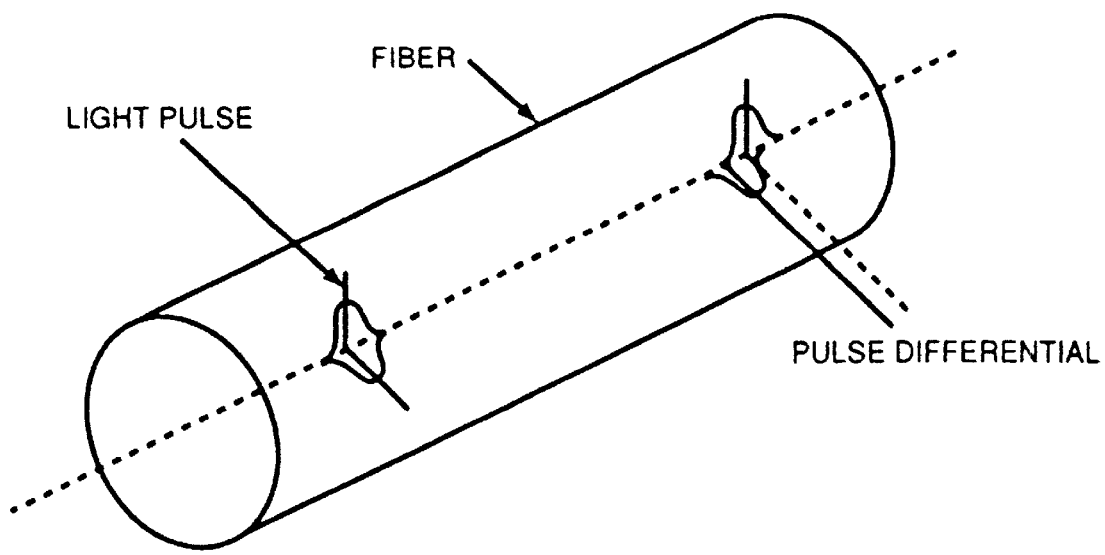
FIG. 1 is a graphical illustration of polarization mode dispersion in an optical fiber.
Figure 4:
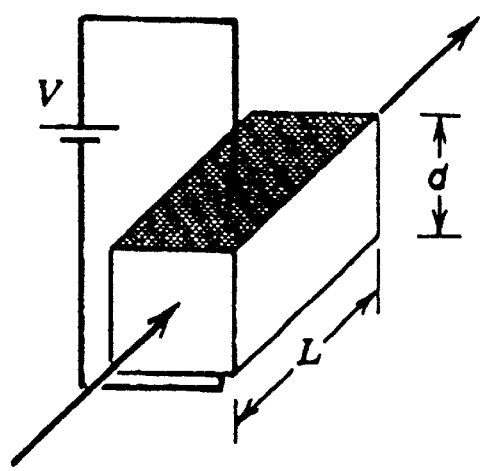
FIG. 4 is a perspective illustration of a polarization modulator that may be employed in a preferred embodiment of the present invention.

According to the preferred embodiment, transmitting end 12 further includes a polarization modulator 22, which serves to modulate the polarization of the optical signal before the signal is coupled to channel 14 for transmission. For purposes of example, polarization modulator 22 may be a conventional transverse Pockets cell, as shown, for instance, in FIG. 4. As is known in the art, when an electric field is applied to the Pockels cell, the optical waveform traversing the Pockels cell will undergo a phase shift based in part on the length of the cell and the electric field intensity. Typically, the electric field is obtained by applying a control signal or drive voltage V across two faces of the cell, as further shown in FIG. 4. Alternatively, it will be appreciated that polarization modulator 22 may take other forms now known or later developed.

Once the optical signal has been FEC-encoded and polarization-modulated, the transmitting end 12 couples the optical signal to channel 14. For reference, this optical signal may be referred to as an input signal, which has an input polarization. The input polarization of the signal is thus varied over time by polarization modulator 22, as will be described more below.

At receiving end 16, a received optical signal is then coupled from channel 14 into an optical receiver 24. Optical receiver 24 may comprise a conventional, photodiode or other suitable photoelectric device that serves to convert the received signal from an optical waveform into a substantially identical electrical waveform.

Figure 3B:
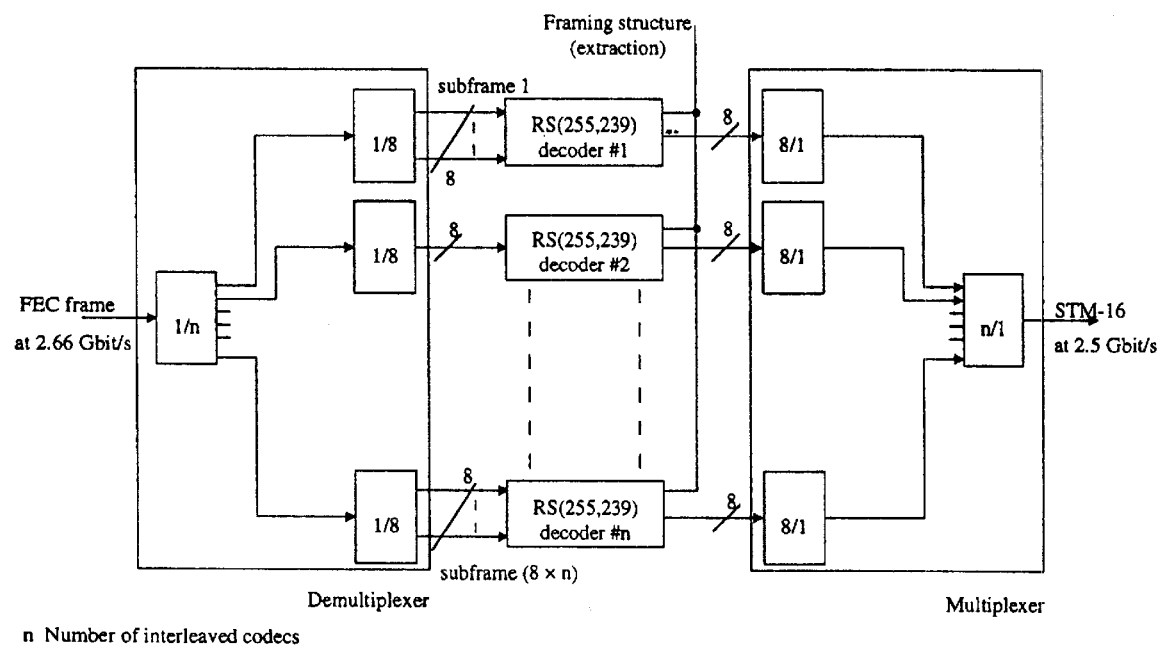
FIG. 3B is block diagram illustrating the architecture of an FEC decoder that may be employed in a preferred embodiment of the present invention.

Due to PMD and other distortions in channel 14, the received signal may include many errors. Accordingly, the receiving end preferably includes an FEC decoder 26, which serves to detect errors in the signal and to correct those errors to the extent possible. In the example set forth above, FEC decoder 26 therefore serves to decode each 255 bit FEC block of the RS(255, 239) block code as necessary, using the parity information added by encoder 20. FIG. 3B illustrates the architecture of one such FEC decoder as recommended by ITU Recommendation G.975, which operates by demultiplexing the received data stream into FEC subframes, decoding those subframes individually, and then multiplexing the decoded data frames into an output data stream.

As shown in FIG. 2, FEC decoder 26 may be implemented as an integral part of receiver 24, for instance, through digital signal processing, computer-controlled processing or other suitable mechanism. Alternatively, FEC decoder 20 may be a discrete element (such as a digital signal processor) external to transmitter, which operates on the received signal.

In operation, as the optical signal passes into and through channel 14, it is decomposed into its PSP components, which vary unpredictably with the PSPs of the channel. As discussed above, at times during transmission, the optical signal may suffer from a worst-case PMD effect (caused by its PSP components being of equal amplitude), and at other times the optical signal may suffer from little or no PMD effect (due to one of its PSP components being near zero or zero). Since the PMD effect changes slowly with time, however, when the instantaneous PMD effect is large, the errors that it causes could exceed FEC error tolerance of the system, rendering the FEC coding ineffective. With the RS(255,239) FEC code, for example, an instantaneous worst-case PMD effect could tend to give rise to more than 8 byte-errors over the course of one or more FEC blocks, even if those blocks are interleaved to some extent as described above.

To avoid this problem, according to the preferred embodiment of the invention, the modulation frequency of polarization modulator 22 is set high enough to effectively scramble the input polarization and thereby ensure on average that waveform does not maintain equal PSP components over the length of any given FEC block. In the preferred embodiment, polarization modulator 22 performs this function by cycling the input polarization from linear polarization to circular polarization and back again to linear polarization at an appropriate frequency, f. Frequency f will depend on the data bit rate and the chosen FEC coding scheme, in order to cause the input polarization to change often enough over each FEC block.

In the above example, for instance, if the data bit rate output from RS(255,239) encoder 20 is R and the encoder operates on ⅛ of the bit stream at a time, and if the input data stream employs N bit interleaving, then the modulation frequency f of the polarization modulator may be given by:

$$f = \frac{R}{255 \times 8 \times N}, \text{(Hz)}$$

Thus, for instance, assuming that R=2.488 Gbps and N=16, an appropriate polarization modulation frequency will be around 80 kHz.

In the preferred embodiment, the drive voltage V applied to the polarization modulator should be at least the half-wave voltage $V_\pi$, which is the voltage required to obtain a phase shift of $\pi$. By cycling the input polarization by at least $\pi$ over the duration of each FEC block, the PMD effect imposed on the optical signal will be likely to change between minimum and maximum (or best-case and worst-case) over each FEC block. As a result, during each such period, the influence of PMD will be less than if the PMD had been worst-case for the entire period. Consequently, the invention will render the optical transmission system more resistant to the PMD effect and thereby increase the PMD-limited transmission distance.

A preferred embodiment of the present invention has been described above. Those skilled in the art will understand, however, that changes and modifications may be made in this embodiment without departing from the true scope and spirit of the present invention, which is defined by the following claims.

We claim:

1. A method for reducing influence of polarization mode dispersion on transmission of a signal along an optical fiber, the signal being FEC encoded for transmission along the fiber so that the signal includes a plurality FEC blocks, the signal having an input polarization, the method comprising varying the input polarization of the signal over time by applying a polarization modulator at a modulation frequency to effectively scramble the input polarization and thereby ensure that on average the signal does not maintain equal PSP components over the length of any given one of said FEC blocks.

2. A method as claimed in claim 1, further comprising applying a half-wave AC drive voltage to the polarization modulator.

3. A method for reducing influence of polarization mode dispersion on transmission of a signal along an optical fiber, the signal being FEC encoded for transmission along the fiber, the signal having an input polarization, the method comprising:
   varying the input polarization of the signal over time,
   wherein varying the input polarization of the signal comprises applying a polarization modulator; and
   wherein the signal comprises a plurality of FEC blocks output by an FEC encoder; and
   wherein varying the input polarization of the signal over time comprises changing the input polarization by at least it over each FEC block.

4. A method for improving transmission of an optical signal along a fiber, the fiber causing polarization mode dispersion (PMD) errors in transmission of the optical signal, the optical signal having a polarization state, the method comprising, in combination, before transmission of the optical signal along said fiber:
   forward-error-correction (FEC) encoding the optical signal with an FEC encoder, said FEC encoder providing a sequence of FEC output blocks and defining an FEC error tolerance per FEC output block; and
   applying a polarization modulator to the optical signal, the polarization modulator having a modulation frequency and modulating the polarization state of the optical signal over time sufficiently to reduce the average number of PMD errors to at most the FEC error tolerance per FEC output block.

5. A method as claimed in claim 4, wherein said FEC coder comprises a Reed-Solomon block coder.

6. A method for improving transmission of an optical signal along a fiber, the fiber causing polarization mode dispersion (PMD) errors in transmission of the optical signal, the optical signal having a polarization state, the method comprising, in combination, before transmission of the optical signal along said fiber:
   forward-error-correction (FEC) encoding the optical signal with an FEC encoder, said FEC encoder providing a sequence of FEC output blocks and defining an FEC error tolerance per FEC output block; and
   modulating the polarization state of the optical signal over time sufficiently to reduce the average number of PMD errors to at most the FEC error tolerance per FEC output block,
   wherein modulating the polarization state of the optical signal over time comprises changing the polarization state by at least $\pi$ over each FEC output block.

7. A method for improving transmission of an optical signal along a fiber, the fiber causing polarization mode dispersion (PMD) of the optical signal and thereby creating transmission errors in the signal, the optical signal having a polarization state, the method comprising, in combination, before transmission of the optical signal along said fiber:

forward-error-correction (FEC) encoding the optical signal, said FEC encoding having a level of effectiveness dependent on the number of transmission errors in the signal; and varying the polarization state of the optical signal over time by applying a polarization modulator to the optical signal, the polarization modulator having a modulation frequency and modulating the optical signal sufficiently to reduce the PMD of the signal over time and to thereby increase the level of effectiveness of said FEC encoding, whereby, varying the polarization state of the optical signal over time decreases the number of transmission errors caused by PMD in the optical signal over time and thereby increases the level of effectiveness of said FEC encoding.

8. A method as claimed in claim 7, wherein FEC encoding the optical signal comprises applying a Reed-Solomon block coder.

9. A method for improving transmission of an optical signal along a fiber, the fiber causing polarization mode dispersion (PMD) of the optical signal and thereby creating transmission errors in the signal, the optical signal having a polarization state, the method comprising, in combination, before transmission of the optical signal along said fiber:

forward-error-correction (FEC) encoding the optical signal, said FEC encoding having a level of effectiveness dependent on the number of transmission errors in the signal; and varying the polarization state of the optical signal over time sufficiently to reduce the PMD of the signal over time and to thereby increase the level of effectiveness of said FEC encoding, wherein varying the polarization state of the optical signal comprises applying a polarization modulator, and wherein varying the polarization state of the optical signal over time comprises changing the polarization state by at least π over each FEC output block, whereby, varying the polarization state of the optical signal over time decreases the number of transmission errors caused by PMD in the optical signal over time and thereby increases the level of effectiveness of said FEC encoding.

10. In an optical transmission system comprising an optical fiber, said optical fiber variably defining two principle states of polarization (PSPs) cooperatively causing polarization mode dispersion (PMD) of an optical signal transmitted through said fiber and thereby causing a PMD error in said optical signal, said PMD error being least when the optical signal is polarized entirely along one of the two PSPs, and said PMD error being greatest when the optical signal is polarized midway between the two PSPs, a method of reducing the influence of PMD on a signal transmitted through said fiber, said signal having an input polarization, said method comprising, in combination:

encoding said signal with a forward error correction (FEC) encoder defining an FEC error tolerance; and varying the input polarization of said signal over time by applying a polarization modulator at a modulation frequency, to effectively scramble the input polarization and to thereby vary the PMD error in the signal sufficiently over time to reduce the PMD error in the signal to at most the FEC error tolerance.

11. In an optical transmission system comprising an optical fiber, said optical fiber variably defining two principle states of polarization (PSPs) cooperatively causing polarization mode dispersion (PMD) of an optical signal transmitted through said fiber and thereby causing a PMD error in said optical signal, said PMD error being least when the optical signal is polarized entirely along one of the two PSPs, and said PMD error being greatest when the optical signal is polarized midway between the two PSPs, a method of reducing the influence of PMD on a signal transmitted through said fiber, said signal having an input polarization defining a phase, said method comprising, in combination:

encoding said signal with a forward error correction (FEC) encoder defining an FEC error tolerance, the FEC encoder outputting a sequence of FEC blocks; and varying the input polarization of said signal over time and thereby varying the PMD error in the signal sufficiently over time to reduce the PMD error in the signal to at most the FEC error tolerance, wherein varying the input polarization of said signal over time comprises changing the phase of the signal by at least r over each of said FEC blocks.

12. A system for improving transmission of a signal along an optical fiber, the optical fiber causing polarization mode dispersion (PMD) errors in transmission of the signal, the signal having a input polarization state, the system comprising, in combination, a forward-error-correction (FEC) encoder for encoding the signal, the FEC encoder providing a sequence of FEC output blocks and defining an FEC error tolerance per FEC output block; and a polarization modulator having a modulation frequency, for modulating the input polarization state of the signal at the modulation frequency sufficiently to reduce the average number of PMD errors to at most the FEC error tolerance per FEC output block.

13. A system for improving transmission of a signal along an optical fiber from a transmitting end to a receiving end, the optical fiber causing polarization mode dispersion (PMD) errors in transmission of the signal, the system comprising, in combination, a forward-error-correction (FEC) encoder for encoding the signal, the FEC encoder providing a sequence of FEC output blocks and defining an FEC error tolerance per FEC output block;

an optical transmitter for converting the signal to an optical waveform having a polarization state;

a polarization modulator, at the transmitting end, for modulating the polarization state of the optical waveform at a modulation frequency sufficiently to reduce the average number of PMD errors to at most the FEC error tolerance per FEC output block; and an FEC decoder for decoding a received signal.

14. A system as claimed in claim 13, wherein the polarization modulator is driven by a half-wave AC drive voltage.

15. A system as claimed in claim 13, wherein the FEC coder comprises a Reed-Solomon block coder.

16. A system for improving transmission of a signal along an optical fiber, the optical fiber causing polarization mode dispersion (PMD) errors in transmission of the signal, the system comprising, in combination, a forward-error-correction (FEC) encoder for encoding the signal, the FEC encoder providing a sequence of FEC output blocks and defining an FEC error tolerance per FEC output block;

an optical transmitter for converting the signal to an optical waveform having a polarization state;

a polarization modulator for modulating the polarization state of the optical waveform over time sufficiently to reduce the average number of PMD errors to at most the FEC error tolerance per FEC output block, wherein the polarization modulator changes the polarization state of the optical waveform by at least $\pi$ over each FEC output block; and an FEC decoder for decoding a received signal.

17. A method for improving transmission of a signal optically along a fiber from a first end to a second end, the fiber causing polarization mode dispersion (PMD) errors in transmission of the signal, the signal having an input polarization upon entry into the fiber at the first end, the method comprising, in combination, before transmission of the signal along the fiber to the second end:

forward-error-correction (FEC) coding the signal with an FEC encoder, the FEC encoder providing a sequence of FEC output blocks and defining an FEC error tolerance per FEC output block; and modulating the input polarization of the signal at a modulation frequency rather than in response to a feedback signal from the second end, sufficiently to reduce the average number of PMD errors to at most the FEC error tolerance per FEC output block.

18. A system for improving transmission of a signal optically along a fiber from a first end to a second end, the fiber causing polarization mode dispersion (PMD) errors in transmission of the signal, the signal having an input polarization state upon entry into the fiber at the first end, the method comprising, in combination, before transmission of the signal along the fiber to the second end:

a forward-error-correction (FEC) encoder for encoding the signal, the FEC encoder providing a sequence of FEC output blocks and defining an FEC error tolerance per FEC output block; and a polarization modulator for modulating the input polarization state of the signal at a modulation frequency rather than in response to a feedback signal from the second end, sufficiently to reduce the average number of PMD errors to at most the FEC error tolerance per FEC output block.

* * * * *